US006532359B1

(12) United States Patent
Lin (10) Patent No.: US 6,532,359 B1
(45) Date of Patent: Mar. 11, 2003

(54) SYSTEM AND METHOD FOR REMOTE CONVENIENCE FUNCTION CONTROL UTILIZING NEAR ISOTROPIC RECEIVING ANTENNA SYSTEM

(75) Inventor: Xing Ping Lin, Waterford, MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/256,498

(22) Filed: Feb. 23, 1999

(51) Int. Cl.[7] ................................................. H04B 1/06
(52) U.S. Cl. ................................. 455/277.1; 455/101
(58) Field of Search ........................... 455/73, 66, 92, 455/101, 133, 134, 135, 136, 132, 140, 143, 151.4, 161.3, 279.1, 280; 340/825.69, 825.72

(56) References Cited

U.S. PATENT DOCUMENTS

| 3,229,294 | A | | 1/1966 | Bryden et al. | |
|---|---|---|---|---|---|
| 3,242,495 | A | | 3/1966 | Kohl | |
| 3,757,315 | A | | 9/1973 | Birchfield et al. | |
| 4,525,869 | A | | 7/1985 | Hamada et al. | |
| 4,566,133 | A | | 1/1986 | Rambo | |
| 4,763,121 | A | * | 8/1988 | Tomoda et al. | 340/825.54 |
| 4,897,644 | A | * | 1/1990 | Hirano | 340/825.31 |
| 4,978,963 | A | | 12/1990 | Thorpe | |
| 5,138,327 | A | * | 8/1992 | Chang et al. | 342/367 |
| 5,710,995 | A | * | 1/1998 | Akaiwa et al. | 455/277.2 |
| 5,757,866 | A | | 5/1998 | Kannari et al. | |
| 5,771,022 | A | | 6/1998 | Vaughan et al. | |
| 5,799,245 | A | | 8/1998 | Ohashi | |
| 6,025,786 | A | * | 2/2000 | Rayford | 340/825.31 |
| 6,085,076 | A | * | 7/2000 | Lindsay et al. | 455/277.1 |
| 6,236,850 | B1 | * | 5/2001 | Desai | 455/343 |

* cited by examiner

Primary Examiner—Edward F. Urban
Assistant Examiner—Charles Craver
(74) Attorney, Agent, or Firm—Tarolli, Sundheim, Covell & Tummino L.L.P.

(57) ABSTRACT

A remote convenience system (10) and an associated method provide for remote control a convenience function. A portable transmitter unit (12) is operable for remote function requests. The transmitter unit (12) includes circuitry (32) for transmitting a signal (18) that conveys a remote function request. A receiver/controller unit (14) receives the transmitted signal (18) and causes performance of the remotely requested function. The receiver/controller unit (14) includes a plurality of antennae (52), each for picking-up the transmitted signal (18) and outputting an electrical signal that conveys the remote function request. Each of the antennae (52) is configured to have an ability to pick-up the transmitted signal (18) that is dependent upon direction from the receiver/controller unit (14) to the transmitter unit (12). The ability of each of the antennae (52) is different from the ability of the other antennae. A control portion (48) determines which one of the antennae (52) has a better ability to pick-up the transmitted signal. The electrical signal from the one antenna with the better ability is used to determine the remotely requested function.

4 Claims, 5 Drawing Sheets

SYSTEM AND METHOD FOR REMOTE CONVENIENCE FUNCTION CONTROL UTILIZING NEAR ISOTROPIC RECEIVING ANTENNA SYSTEM

FIELD OF THE INVENTION

The present invention relates to remote convenience systems, and is particularly directed to systems in which an ability of a receiver/controller unit to receive a transmitted signal from a transmitter unit, located not more than a certain distance away from the receiver/controller unit, is generally isotropic.

BACKGROUND OF THE INVENTION

Remote convenience systems are known in the art. Such remote convenience systems permit remote control of certain functions. One type of a remote convenience system is for remotely controlling vehicle functions. Other example types of remote convenience systems include garage door opener systems and entry light activation systems.

Focusing now on the remote convenience vehicle systems, examples of remotely controlled functions include locking and unlocking of one or more vehicle doors. Remote convenience vehicle systems that permit remote locking and unlocking functions are commonly referred to as remote keyless entry systems. Such remote convenience vehicle systems may provide for control of other vehicle functions. For example, a remote vehicle locator function may be provided. The vehicle locator function causes the vehicle arm to emit a horn chirp and/or the headlights of the vehicle to flash "ON". This allows a person to quickly locate their car within a crowded parking lot.

Known remote convenience vehicle systems include a receiver/controller unit mounted in an associated vehicle and at least one portable hand-held transmitter unit located remote from the receiver/controller unit. The receiver/controller unit is operatively connected to one or more vehicle systems (e.g., a door lock actuator system) that perform the functions that are remotely requested.

Each transmitter unit is provided with one or more manually actuatable switches. Each switch is associated with a remote control vehicle function to be performed. The transmitter unit includes circuitry that responds to the actuation of each switch to transmit a message in the form of a digital signal. When the receiver/controller unit receives such a digital signal, a controller portion of the receiver/controller unit outputs a signal to the proper vehicle system.

The reception of the transmitted signal by the receiver/controller unit is dependent upon the strength of the transmitted signal that reaches the receiver/controller unit and the ability of an antenna at the receiver/controller unit to pick-up the signal. The receiving antenna's pick-up ability is influenced by directivity. Thus, remote control may be accomplished from a relatively long distance when the transmitter unit is located along a first direction from the receiving antenna, and remote control may be only accomplished from a relatively short distance when the transmitter unit is located along a second, different direction.

SUMMARY OF THE INVENTION

In accordance with one aspect, the present invention provides a remote convenience system for remotely controlling a convenience function. The system includes portable transmitter means for remote function requests. The transmitter means includes means for transmitting a signal that conveys a remote function request. Receiver/controller means of the system receives the transmitted system and causes performance of the remotely requested function. The receiver/controller means includes a plurality of antenna means, each for picking-up the transmitted signal and outputting an electrical signal that conveys the remote function request. Each of the plurality of antenna means is configured to have an ability to pick-up the transmitted signal that is dependent upon direction from the receiver/controller means to the transmitter means. The ability of each of the plurality of antenna means is different from the ability of the other of the plurality of antenna means. The receiver/controller means includes means for determining which one of the plurality of antenna means has a better ability to pick-up the transmitted signal. The receiver/controller means includes means for utilizing the electrical signal from the one antenna means to determine the remotely requested function.

In accordance with another aspect, the present invention provides a receiver/controller apparatus for a remote convenience system. The apparatus is responsive to a remote convenience function request conveyed via an electromagnetic signal transmitted from a portable transmitter for controlling performance of an associated function. The apparatus includes a plurality of antenna means, each having a reception pattern oriented in a different direction. Each antenna means for picking-up the electromagnetic signal and for outputting a respective, electrical antenna-output signal conveying the function request and having a strength related to the position of the transmitter with respect to the associated reception pattern orientation direction. Receive circuitry means processes one of the antenna-output signals and outputs an electrical signal conveying a function request in response to the processing of the one antenna-output signal. Signal selection means determines which antenna-output signal has a greater strength and causes the receiver circuitry means to process the antenna-output signal having the greater strength.

In accordance with yet another aspect, the present invention provides a receiver/controller apparatus that includes first antenna means, having a reception pattern oriented in a first direction. The first antenna means for picking-up the electromagnetic signal, and for outputting a first electrical antenna-output signal conveying the function request and having a strength related to the position of the transmitter with respect to the first direction. Second antenna means of the receiver/controller apparatus has a reception pattern oriented in a second direction that is different from the first direction. The second antenna means for picking-up the electromagnetic signal and for outputting a second, electrical antenna-output signal conveying the function request and having a strength related to the position of the transmitter with respect to the second direction. Receive circuitry of the apparatus processes one of the antenna-output signals and outputs an electrical signal conveying the function request in response to the processing of the one antenna-output signal. Signal selection means of the apparatus determines which antenna-output signal has a greater strength and causes the received circuitry means to process the antenna-output signal having the greater strength.

In accordance with still another aspect, the present invention provides a method for remotely controlling a convenience function. A signal that conveys a remote function request is transmitted. Each antenna, of a plurality of receiving antennae, is sequentially enabled during a portion of the transmitted signal. A value indicative of the reception ability of each antenna is derived. A determination is made as to which antenna is associated with better reception. Only the antenna associated with the determined better reception is enabled during a portion of the transmitted signal that conveys the remote function request. The remotely requested function is determined utilizing a signal that is output from the antenna associated with the determined better reception. The remotely requested function is performed.

BRIEF DESCRIPTION OF THE DRAWINGS

The foregoing and other features and advantages of the present invention will become apparent to those skilled in the art to which the present invention relates upon reading the following description with reference to the accompanying drawings, wherein.

DESCRIPTION OF PREFERRED EMBODIMENTS

Figure 1:
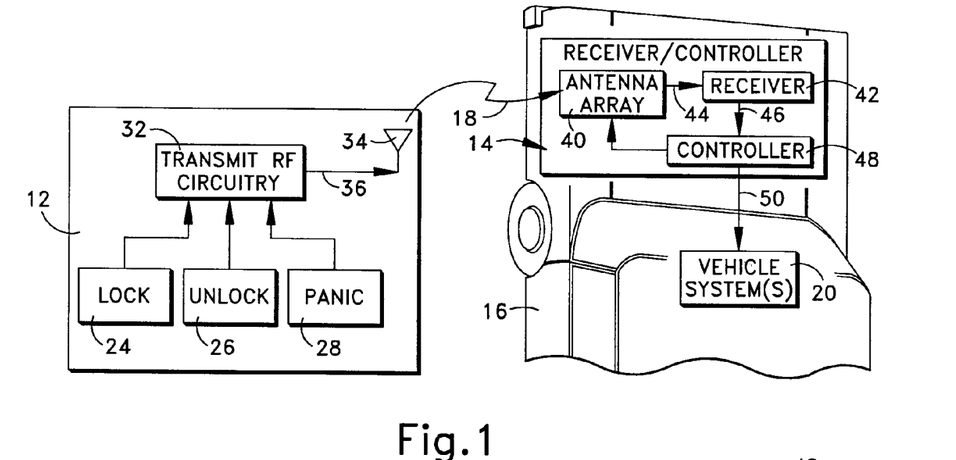
FIG. 1 is a schematic illustration of a remote convenience vehicle system in accordance with the present invention.

A remote convenience vehicle system 10 is schematically shown in FIG. 1. The system 10 includes a transmitter unit 12 and an associated receiver/controller unit 14 that is mounted in a vehicle 16. The transmitter unit 12 is operable to communicate, via a signal 18, with the receiver/controller unit 14 to achieve remote control performance of at least one convenience function (e.g., unlock doors) at a vehicle system 20 (e.g., vehicle door lock actuator) of the vehicle 16. The transmitter unit 12 is operated when it is desired to cause performance of the requested remote convenience function at the vehicle 16.

The transmitter unit 12 is a portable hand-held unit with a housing that encloses its electronic components. The transmitter unit 12 includes at least one manually actuatable pushbutton electric switch. In the example shown in FIG. 1, there are three pushbutton selector switches 24–28. A first pushbutton switch 24 and a second pushbutton switch 26 are associated with door lock and unlock functions, respectively. A third pushbutton switch 28 is associated with a vehicle alarm or "panic" function. It will be appreciated that the system 10 could be configured to control different remote convenience functions, and that the transmitter structure (e.g., the number, type, and the location of the pushbutton switches on the transmitter) would be accordingly different.

Each actuation or predefined series of actuations, of one of pushbutton switches (e.g., 24) of the transmitter unit 12 is a request to perform a corresponding predefined remote convenience function. For example, actuating pushbutton switch 24 is a request to lock the doors of the vehicle 16. The pushbutton switches 24–28 are operatively connected to a transmit radio frequency (RF) circuitry 32 within the housing of the transmitter unit 12. The transmit RF circuitry 32 is, in turn, operatively connected to a broadcast transmission antenna 34.

In response to pushbutton actuation, transmit RF circuitry 32 generates/assembles a "packet" of information to be transmitted. The transmission packet includes a start/wake-up portion, a security code, and at least one command that represents the remote function request. The transmit RF circuitry 32 then provides an appropriate electrical signal 36 that conveys the transmission packet to the antenna 34. In response to the stimulus of the electrical signal 36, antenna 34 broadcasts the signal 18, which is intended to be received by the receiver/controller unit 14 at the vehicle 16. Preferably, the transmitted signal 18 is a pulse-width-modulated (PWM) signal that has a radio frequency (RF) carrier frequency. It is to be appreciated that other signal types (e.g., frequency modulation, frequency shift key) can be used without deviating from the present invention.

Within the receiver/controller unit 14, an antenna array 40 is operatively connected to a receiver portion 42. The antenna array 40 provides an electrical signal that 44 conveys the contents (e.g., a security code and a function request message) of the transmitted signal 18 that has been received. The receiver portion 42 processes the conveyed information and provides a signal 46 to a controller portion 48. Specifically, in one preferred embodiment, the receiver portion 42 includes an amplifier, a mixer that beats the signal with a local oscillator signal, a buffer, and a bandpass filter. Thus, the signal is converted to an intermediate or baseband frequency having a plurality of pulses. Each pulse has amplitude that is dependent upon the strength of the transmitted signal 18.

Preferably, the amplitude is voltage.

Within the controller portion 48, the information-conveying pulses are processed to determine if the transmitted signal 18 includes a proper security code and to determine the function that is requested. If the transmitted signal 18 includes the proper security code, the controller portion 48 provides an appropriate signal 50 to the corresponding vehicle system 20 (e.g., door lock actuator system, horn system) to cause performance of the requested function.

With regard to the convenience functions that are remotely controlled via the system 10, the person of ordinary skill in the art will understand the vehicle systems 20 and the operation of such functions, as they are known in the art. Accordingly, detailed descriptions of such systems and functions are not provided herein and for brevity. Also, it will be appreciated that the present invention is applicable to other non-automotive, remotely controlled functions (e.g., garage door opening or entry light activation).

Often it is desirable to have the signal 18 reach the vehicle and cause performance of the remotely requested function from a maximum predetermined distance, regardless of the direction along which the transmitter unit 12 is located from the vehicle 16, and thus the receiver/controller unit 14. Therefore, the receiver/controller unit 14, in accordance with the present invention, provides for near-isotropic reception. The structure that provides the near-isotropic reception ability is now described.

Figure 2:
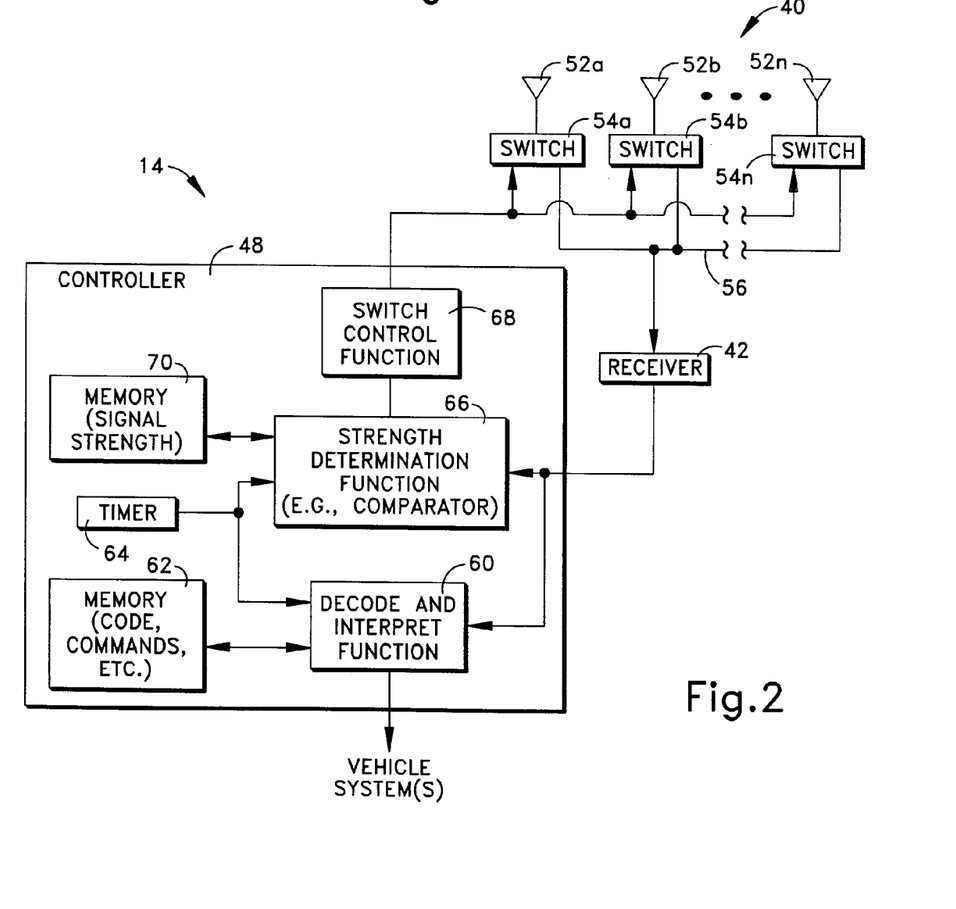
FIG. 2 is a schematic illustration of a receiver/controller unit shown in FIG. 1.

The antenna array 40 includes a plurality of antennae 52a–52n (FIG. 2). Each of the antennae (e.g., 52a) has a reception pattern (i.e., an ability to pick-up the transmitted signal 18) that is directional. Thus, the ability of each antenna to pick-up the transmitted signal 18 is a function of the direction from the receiver/controller unit 14 along which the transmitter unit 12 is located. The directivity for each antenna is dependent upon configuration of the particular antenna. Also, the directivity of each antenna is along a different direction. In other words, each antenna is aimed in a different direction. Preferably, the antennae are aimed such that the angular spacing between each pair of adjacent aiming directions is constant.

Each of the antennae (e.g., 52a) is operatively connected, via a switch (e.g., 54a) to a line 56 that extends to the receiver portion 42. The switches 54a–54n may have any suitable circuitry, such as transistors.

The output signal 46 (i.e., the string of pulses) of the receiver portion 42 is provided for use by two parts within the controller portion 48. A first part of the controller portion 48 that utilizes the receiver-output signal 46 is a decode and interpret function 60 for decoding encoded information portions, determining presence of a proper security code, determining requested functions, etc. Memory 62 and a timer clock 64 are provided for use in accomplishing the above-mentioned functions. The person of ordinary skill in the art will appreciate that the above-mentioned functions may be performed by hardwired circuitry or by a processor performing a routine. Further, the person of ordinary skill in the art will appreciate that the above-mentioned functions are known in the art, and are thus not described further herein.

A second part of the controller portion 48 that is operatively connected to receive the output of the receiver portion 42 is a strength determination function 66. The strength determination function 66 is operatively connected to a switch control function 68 of the controller portion 48. The switch control function 68 is operatively connected to each of the switches 54a–54n.

The switch control function 68 controls the switches 54a–54n such that only one of the antennae (e.g., 54a) provides a signal to the receiver portion 42 at any given time. In particular, during a determination period, the connections of the antennae 52a–52n are sequenced. Each antenna (e.g., 52a) is connected, in turn, to the receiver portion 42. During such sequencing, the strength determination function 66 makes a determination regarding each antenna's ability to pick-up the transmitted signal 18. The ability of each of the antennae 52a–52n to pick-up the transmitted signal 18 is indicated by the strength of the respective signal provided to the receiver portion 42, and thus the strength of the signal output from the receiver portion. Preferably, because the strength of the signal is indicated by voltage amplitude, a determination regarding strength is accomplished via determination of voltage amplitude. The voltage amplitude value is used in a comparison against the voltage amplitude values associated with the other antennae.

When the strength determination function 66 determines which antenna provides a better reception of the transmitted signal 18, the strength determination function causes the switch control function 68 to connect only the antenna (e.g., 52a) that provides the better reception.

In order for the strength determination function 66 to make its determinations regarding the ability of each antenna (e.g., 52a) to pick-up the signal 18, a memory 70 of the controller portion 48 is operatively connected to the strength determination function 66. The memory 70 is utilized to store values indicative of reception strength for each of the antennae 52a–52n. Thus, the strength determination function 66 can save information for comparison.

Also, in order for the strength determination function 66 to process information within time constraints and in an expedite manner, the timer 64 of the controller portion 48 is operatively connected to the strength determination function. The strength determination function 66 utilizes the timer 64 to create a time period for which each antenna (e.g., 52a), in turn, is connected to the receiver portion 42. Timing is important because typically, the duration of the transmitted signal 18 is relatively short (e.g., a few hundred milliseconds).

In order for the receiver/controller unit 14 to make a determination as to which antenna (e.g., 52a) provides better reception and then to utilize that antenna to receive pertinent portions of (e.g., the security code and the function request) the signal 18, the determination and selection must occur relatively quickly. Further, the determination and selection must occur prior to the occurrence of the pertinent portions (e.g., security code and function request) within the signal 18. Thus, the determination and selection typically occurs during the start portion of the signal. For example, the start portion of the transmitted signal 18 comprises a series of predefined, unencrypted pulses that exist for a predetermined portion of time.

The start portion is utilized as a "wake-up" to the receiver/controller unit 14. It is to be appreciated that receiver/controller units go into a sleep mode in order to save energy. The start portion does not contain the pertinent portions (e.g., the security code and the remote function requests). Thus, pertinent portions are not "missed" during wake-up of the receiver/controller unit 14. In the preferred embodiment of the present invention, the start portion is utilized for waking the receiver/controller unit 14 and for antenna determination/selection.

Figure 3:
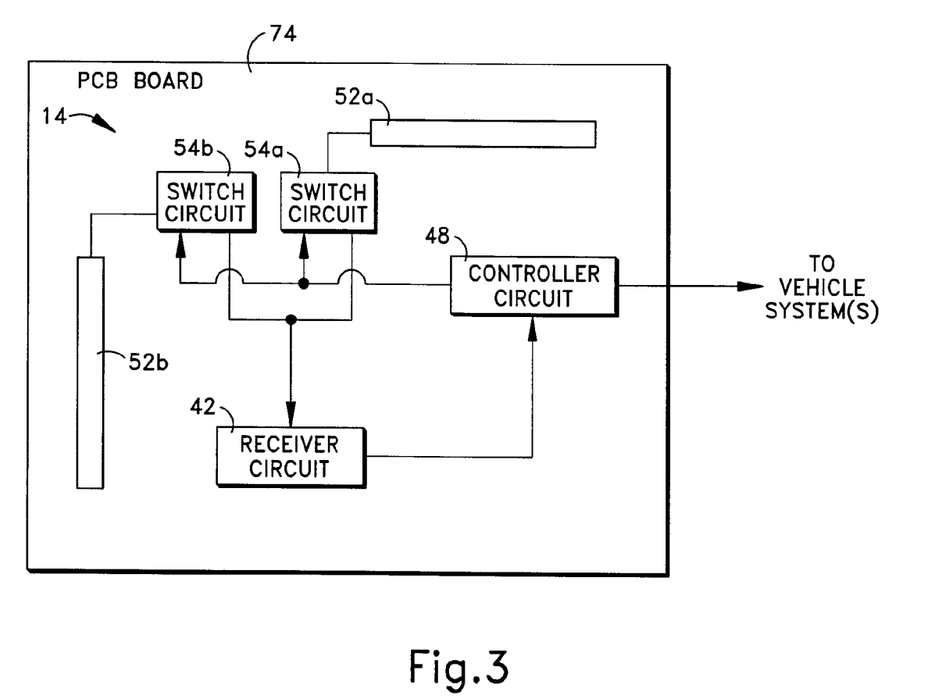
FIG. 3 is an illustration of a printed circuit board with one example embodiment of the receiver/controller unit of FIG. 2 that has two antennae in accordance with the present invention.

Turning now to an example of a manufactured printed circuit board 74 that contains the receiver/controller unit 14 in accordance with the presence invention, attention is directed to FIG. 3. The unit of FIG. 3 includes two antennae 52a and 52b that are oriented perpendicular (i.e., 90°) to each other. Accordingly, it is to be appreciated that the first antenna 52a has a better ability to receive signals in a first direction and the second antenna 52b has a better ability to receive signals in a second direction, the second direction being perpendicular to the first direction. Thus, the combined ability of the two antennae 52a and 52b to receive a signal and provide a strong signal to the receiver portion 42, and in turn the controller portion 48, is improved because each antenna provides reception for the directions that the other antenna may have difficulty providing coverage (i.e., a null direction).

Figure 4:
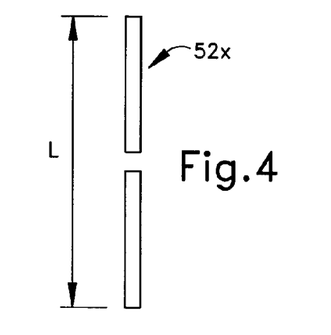
FIG. 4 is an illustration showing orientation of a first antenna.
Figure 5:
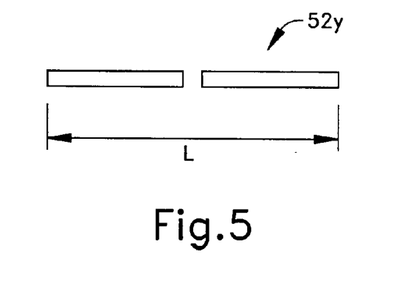
FIG. 5 is an illustration showing orientation of a second antenna.

FIGS. 4–9 provide an illustration of reception ability of two antennae. FIG. 4 illustrates an example of an antenna 52x of length L extending in a first direction. FIG. 5 illustrates an example of an antenna 52y of length L extending in a second, perpendicular direction. The designations of "x" and "y" are used to signify that the two antennae are merely examples and are not specifically associated with any of the previously described antennae.

Figure 6:
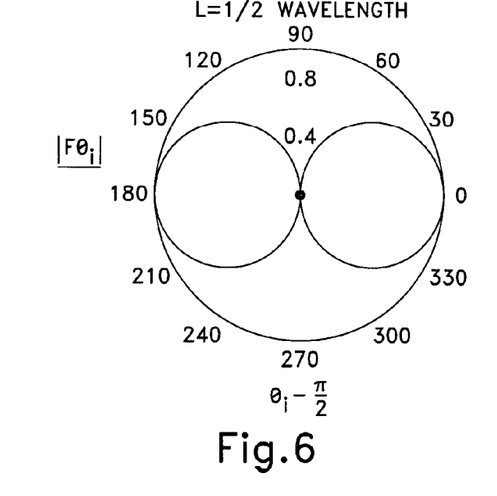
FIG. 6 is a plot showing directional reception ability of the antenna of FIG. 4.
Figure 7:
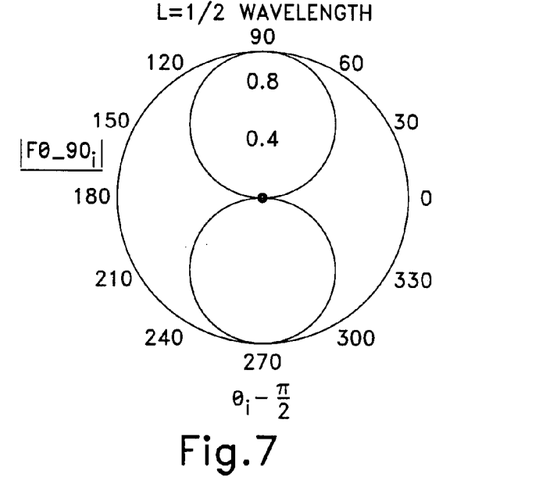
FIG. 7 is a plot showing directional reception ability of the antenna of FIG. 5.
Figure 8:
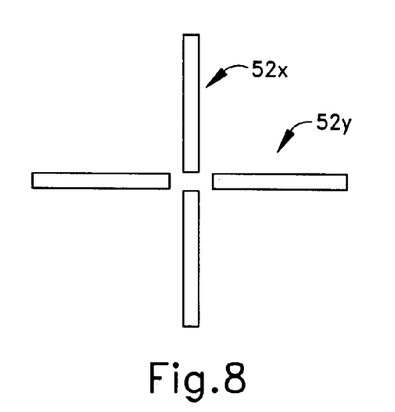
FIG. 8 is an illustration of a combination of the antennae shown in FIGS. 4 and 5.
Figure 9:
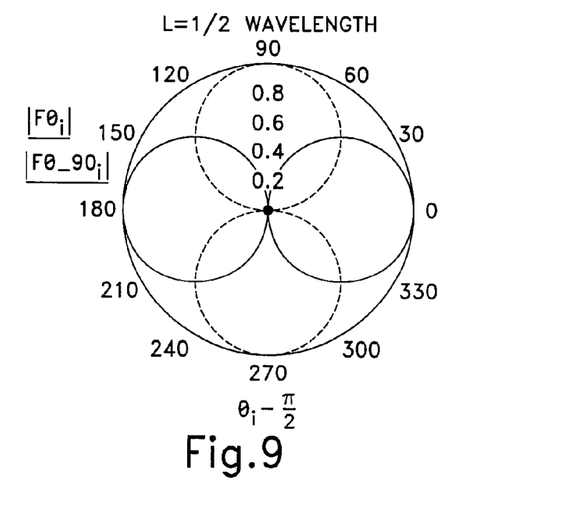
FIG. 9 is an illustration of directional reception abilities of the two antennae of FIG. 8.

FIGS. 6 and 7 illustrate reception nodes of the antenna 52x and 52y of FIG. 4 and FIG. 5, respectively. It can be seen from a comparison of FIGS. 6 and 7 that the reception nodes for antenna 52x extend perpendicular to the reception nodes of the antenna 52y. When the two antennae 52x and 52y are used as a team (FIG. 8, crossed in an "X" pattern for simplicity), at least decent reception occurs for all directions (see FIG. 8). The antenna better able to receive the transmitted signal 18 is selected for use, in accordance with the present invention.

Turning to antenna selection, it is to be appreciated that many different processes may be utilized in accordance with the present invention to determine when to begin sequencing through the antennae 51a–52n for the purpose of making a determination as to which antenna will provide better reception. For example, a single antenna (e.g., 52a) can be left connected/enabled to listen for the beginning of the transmitted signal 18. Alternatively, the connection of the antennae 52a–52n can be sequenced such that each antenna has a turn listening for the beginning of the transmitted signal. As yet another alternative, all of the antennae 52a–52n could be connected for the sole purpose of listening for the beginning of the transmitted signal 18.

Further, it is to be appreciated that many different processes may be utilized in accordance with the present invention to sequence through the antennae and to make the determination as to which antenna will provide better reception. A first example of a process 100 for the determination sequencing that is performed within the receiver/controller unit 14 is set forth in FIG. 10. The process 100 begins at step 102 and proceeds to step 104. At step 104, a variable "A" is set equal to 1. It is to be noted that the total number of antennae is equal to N.

Figure 10:
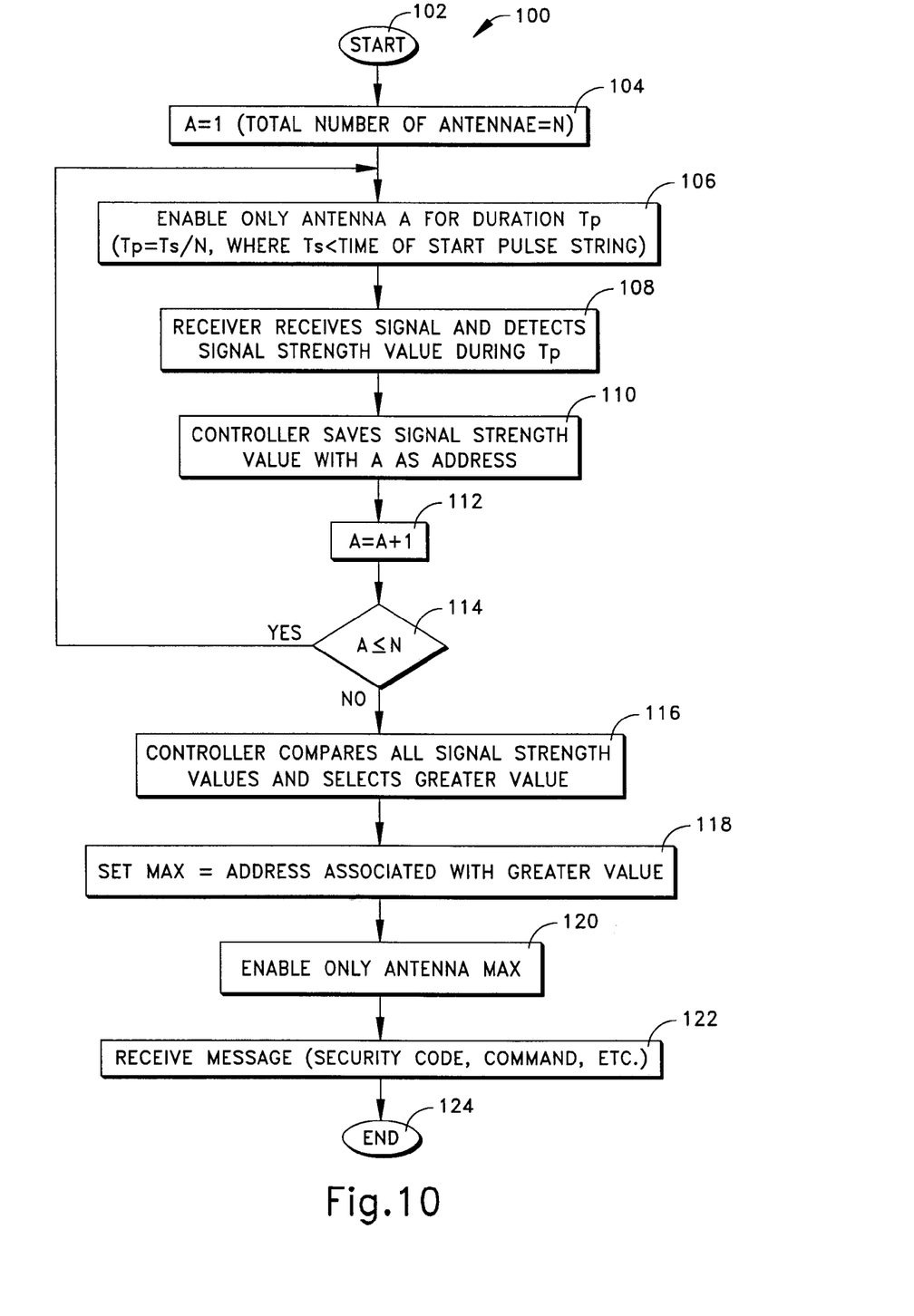
FIG. 10 is a flow chart for a first example of a process performed within the receiver/controller unit of FIG. 2.

At step 106, antenna A is enabled (switched ON to be connected to the receiver portion 42) via the switch control function 68 for a duration $T_p$. It is to be noted that $T_p=T_s/N$, where $T_s$ is less than the duration of the start pulse string. Thus, each of the plurality of antennae is switched ON at some point during the start pulse string.

At step 108, an antenna-output signal from the antenna A is received and a signal strength value (e.g., a pulse voltage value) is detected during the associated time period $T_p$. At step 110, the signal strength value is saved to the memory 70 with "A" as the address. At step 112, A is incremented by 1.

At step 114, it is determined whether A is less than or equal to N (i.e., have all the antennae been sequentially switched ON during the start pulse string). If the determination at step 114 is affirmative (i.e., A is less than N indicating that all of the antennae have not yet been switched ON), the process 100 jumps to step 106. At this time within step 106, a new value is provided for A, thus a different antenna is switched ON, and a new, different antenna-output signal is received. The new signal strength is detected and an associated signal strength value saved.

Once all of the antennae 52a–52n have been sequentially switched ON during the time of the start pulse string, the determination at step 114 is negative (A is greater than N) and the process 100 goes to step 116. At step 116, the strength determination function 66 compares all of the signal strength values and selects a greater value. At step 118, a variable MAX is set equal to an address associated with the greater value (e.g., if the second antenna has the greater signal strength, MAX would be set equal to 2). At step 120, the strength determination function 66 causes the switch control function 68 to switch ON only antenna MAX (e.g., the second antenna). At step 122, the pertinent portions of the message (e.g., the security code and the remote command) are received via use of the antenna MAX (e.g., the second antenna), and the process ends at step 124.

Figure 11:
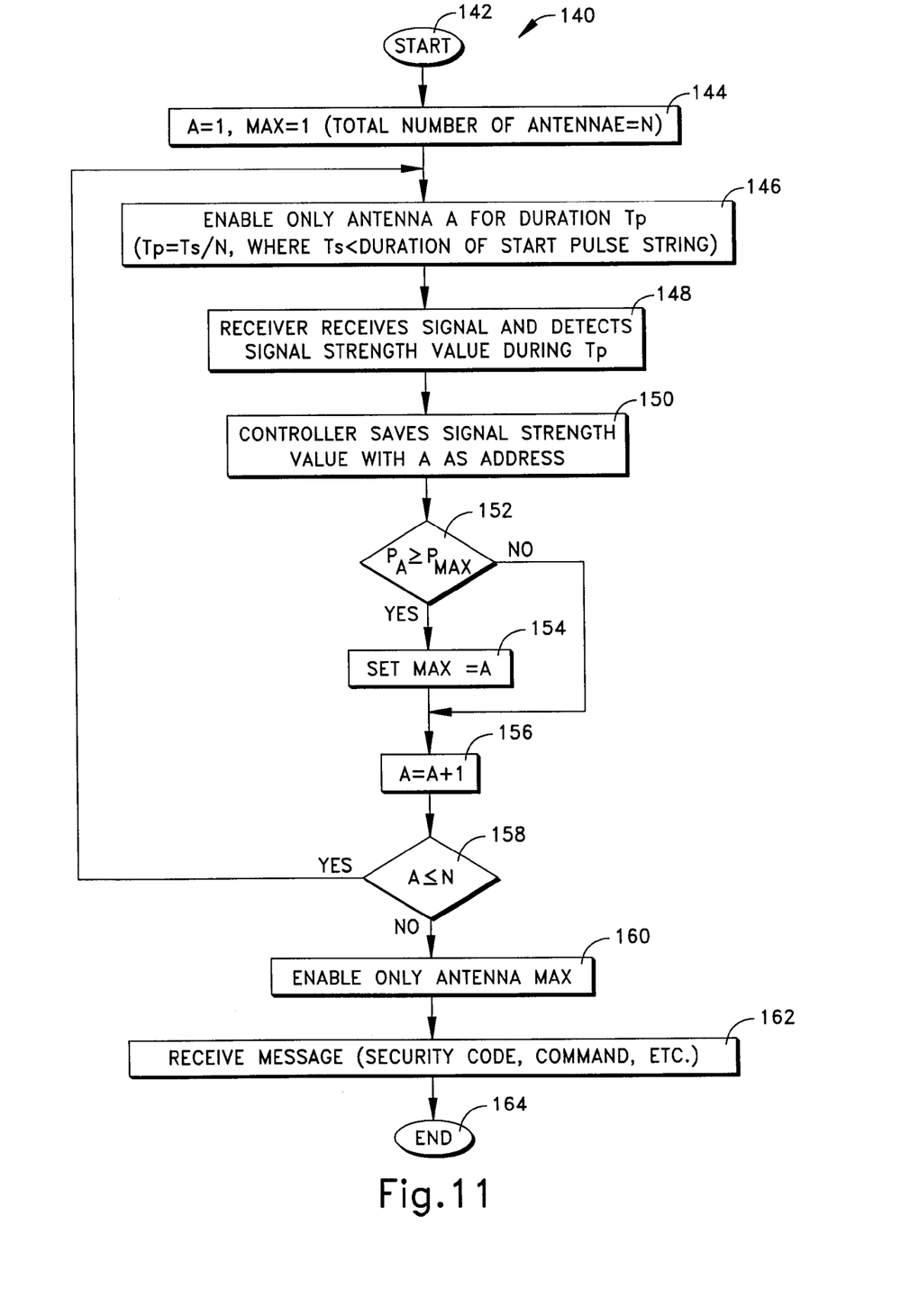
FIG. 11 is a flow chart for a second example of a process performed within the receiver/controller unit of FIG. 2.

A second example of a process 140 performed within the receiver/controller unit 14 for sequencing for antenna selection is set forth in FIG. 11. The process 140 begins at step 142 and proceeds to step 144. At step 144, a variable "A" is set equal to 1, and a variable "MAX" is set equal to 1. It is to be noted that the total number of antennae is equal to N.

At step 146, antenna A is enabled (switched ON to be connected to the receiver portion 42) by the switch control function 68 for a duration $T_p$. It is to be noted that $T_p=T_s/N$, where $T_s$ is less than the duration of the start pulse string. Thus, each of the plurality of antennae is switched ON at some point during the start pulse string.

At step 148, an antenna-output signal from the antenna A is received and a signal strength value is detected during the associated time period $T_p$. One example of signal strength would be a voltage value. At step 150, the signal strength value is saved to the memory 70 with "A" as the address.

At step 152, it is determined whether the signal strength associated with antenna A is greater than or equal to the signal strength associated with antenna MAX. If the determination at step 152 is affirmative (i.e., the signal strength associated with antenna A is greater than or equal to the signal strength associated with antenna MAX), then the process 140 goes to step 154, where MAX is set equal to A. If the determination at step 152 is negative (i.e., the signal strength associated with antenna A is less than the signal strength associated with antenna MAX), then the process 140 skips step 154 and goes to step 156. At step 156, A is incremented by 1.

At step 158, it is determined whether A is less than or equal to N (i.e., have all the antennae been sequentially switched ON during the start pulse string). If the determination at step 158 is affirmative (i.e., A is less than N indicating that all of the antennae have not yet been switched ON), the process 140 jumps to step 146. At this time within step 146, a new value is provided for A, thus a different antenna is switched ON, and a new, different antenna-output signal is received. The new signal strength is detected and an associated signal strength value saved.

Once all of the antennae 52a–52n have been sequentially switched ON during the time of the start pulse string, the determination at step 158 is negative (A is greater than N) and the process 140 goes to step 160. At step 160, the strength determination function 66 causes the switch control function 68 to switch ON only antenna MAX (e.g., the second antenna). At step 162, the pertinent portions of the message (e.g., the security code and the remote command) are received via use of the antenna MAX (e.g., the second antenna), and the process ends at step 164.

From the above description of the invention, those skilled in the art will perceive improvements, changes and modifications. Such improvements, changes and modifications within the skill of the art are intended to be covered by the appended claims.

Having described the invention, the following is claimed:

1. A receiver/controller apparatus for a remote convenience system, said apparatus being responsive to a remote convenience function request conveyed via an electromagnetic signal transmitted from a portable transmitter for controlling performance of an associated function, said apparatus comprising:

a plurality of antenna means, each having a reception pattern oriented in a different direction, for picking-up the electromagnetic signal and for outputting a respective, electrical antenna-output signal, a strength of the respective antenna-output signal being related to the position of the transmitter with respect to the associated reception pattern orientation direction;

receive circuitry means for processing one of the antenna-output signals and for outputting an electrical signal conveying the function request in response to the processing of the one antenna-output signal; and signal selection means for determining which antenna-output signal has a greater strength and for causing said receive circuitry means to process the antenna-output signal having the greater strength;

said signal selection means includes means for comparing amplitude values of antenna-output signals, said signal selection means includes means for controlling the antenna-output signals to determine an amplitude value for only one antenna-output signal at a time, said signal selection means includes memory means for holding amplitude values for later comparison.

2. An apparatus as set forth in claim 1, wherein said signal selection means includes a plurality of switch means, interposed between said plurality of antenna means and said receive circuitry means, for controlling the antenna-output signals such that only one output signal at a time is provided to said receive circuitry means.

3. An apparatus as set forth in claim 2, including timer means for providing a time period used in control of said switch means such that all antenna-output signals are eventually provided to said receive circuitry means during a certain portion of the transmitted signal.

4. An apparatus as set forth in claim 3, wherein the transmitted signal includes a start portion and a function request portion, the certain portion of the transmitted signal is the start portion.

* * * * *